United States Patent
Kalinsky et al.

[11] Patent Number: 6,023,155
[45] Date of Patent: Feb. 8, 2000

[54] UTILIZING A COMBINATION CONSTANT POWER FLYBACK CONVERTER AND SHUNT VOLTAGE REGULATOR

[75] Inventors: Wayne A. Kalinsky; Kenneth F. Webb, both of Cedar Rapids, Id.

[73] Assignee: Rockwell Collins, Inc., Cedar Rapids, Iowa

[21] Appl. No.: 09/169,622

[22] Filed: Oct. 9, 1998

[51] Int. Cl.[7] .............................. G05F 1/40; H02M 3/335; H02M 3/24

[52] U.S. Cl. .......................... 323/274; 323/284; 363/21; 363/97

[58] Field of Search ...................................... 323/266, 273, 323/274, 282, 284; 363/21, 16, 97, 131

[56] References Cited

U.S. PATENT DOCUMENTS

| | | | |
|---|---|---|---|
| 5,377,091 | 12/1994 | Faulk | 363/21 |
| 5,455,757 | 10/1995 | Nguyen et al. | 363/21 |
| 5,680,036 | 10/1997 | Faulk | 323/282 |
| 5,854,742 | 12/1998 | Faulk | 363/97 |

*Primary Examiner*—Peter S. Wong
*Assistant Examiner*—Bao Q. Vu
*Attorney, Agent, or Firm*—Klye Eppele; James P. O'Shaughnessy

[57] ABSTRACT

Disclosed is a secure data system power supply having an input coupleable to an input voltage line and an output coupleable to a secure data system and providing isolation between the input voltage line and the secure data system such that information communicated within the secure data system is undetectable from the input voltage line. The power supply does not utilize a linear current source for isolation, and thereby greatly reduces power loss. A constant power flyback converter is adapted to be coupled between the input voltage line and the secure data system. The constant power flyback converter takes as an input from the input voltage line a constant power input and provides at a converter output an output signal for use in powering the secure data system. A shunt voltage regulator is coupled to the converter output and maintains the output signal at a substantially constant voltage.

11 Claims, 5 Drawing Sheets

6,023,155

UTILIZING A COMBINATION CONSTANT POWER FLYBACK CONVERTER AND SHUNT VOLTAGE REGULATOR

FIELD OF THE INVENTION

The present invention relates generally to power supplies for generating regulated power for use in handling secure information that must not be detectable on the input power line. More specifically, the present invention relates to a shunt voltage regulator type of secure data system power supply providing improved efficiency

BACKGROUND OF THE INVENTION

Power supplies which provide power to secure data systems, such as audio or digital secure communication systems, must be designed such that data communicated within the secure data system is isolated from the input voltage. Without proper isolation, the data communicated within the secure data system can be detected by monitoring the input voltage or other parameters of the power supply.

A typical prior art secure data system power supply utilizes a flyback converter to convert a DC input voltage into a DC link voltage. The DC link voltage feeds a linear current source which provides a constant current at its output. A shunt voltage regulator coupled to the output of the linear current source provides the output voltage to the secure data system. The linear current source provides the isolation between the secure data system and the remainder of the power supply. The linear current source also sets the power limit for the shunt voltage regulator. Inclusion of the linear current source in the secure data system power supply greatly increases the power consumption of the power supply. Typically, the linear current source accounts for as much as 25% of the losses in the secure data system power supply. Consequently, a secure data system power supply which eliminates the power losses associated with the linear current source would be a significant improvement in that it would reduce the total power requirements of the power supply, and would reduce heat dissipation from the power supply.

SUMMARY OF THE INVENTION

Disclosed is a secure data system power supply having an input coupleable to an input voltage line and an output coupleable to a secure data system and providing isolation between the input voltage line and the secure data system such that information communicated within the secure data system is undetectable from the input voltage line. The power supply does not utilize a linear current source for isolation, and thereby greatly reduces power loss. A constant power flyback converter is adapted to be coupled between the input voltage line and the secure data system. The constant power flyback converter takes as an input from the input voltage line a constant power and provides at the converter output an output signal for use in powering the secure data system. A shunt voltage regulator is coupled to the converter output and maintains the output signal at a substantially constant voltage.

DETAILED DESCRIPTION OF THE PREFERRED EMBODIMENTS

Figure 1:
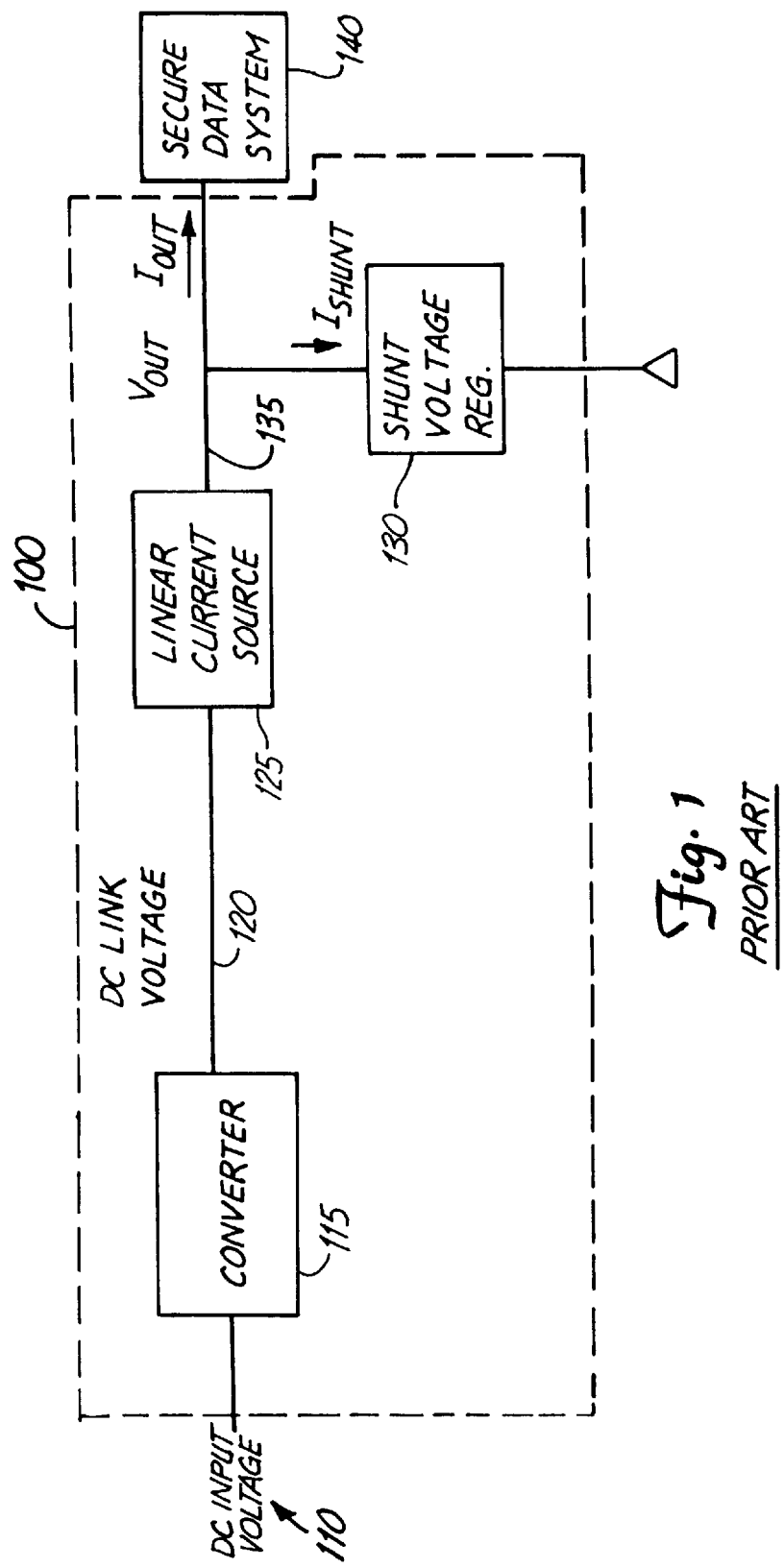
FIG. 1 is a block diagram illustrating a prior art secure data system power supply.

FIG. 1 is a block diagram illustrating prior art secure data system power supply 100. Secure data system power supply 100 includes DC-to-DC voltage converter 115, linear current source 125 and shunt voltage regulator 130. Voltage converter 115 receives DC input voltage 110, which is typically a high power line voltage such as 28 volts. Converter 115 is typically a flyback converter and provides as an output DC link voltage 120. Link voltage 120 is typically a lower voltage than input voltage 110.

Linear current source 125 receives DC link voltage 120 and provides at output 135 a constant current. Shunt voltage regulator 130 is typically a zener diode based regulator and is coupled to the output 135 of linear current source 125 to ensure that the output voltage $V_{OUT}$ is maintained at the desired substantially constant voltage. Output voltage $V_{OUT}$ is provided to secure data system 140 in order to power system 140.

Linear current source 125 isolates secure data system 140 from input voltage line 110 so that information communicated within system 140 cannot be detected on line 110. Linear current source 125 also sets the power limit for the voltage shunt regulator. However, linear current source 125 introduces a voltage drop from its input to its output. Power loss in linear current source 125 is equal to this voltage drop multiplied by the total output current of linear current source 125 ($I_{OUT}+I_{SHUNT}$) This power loss attributed to linear current source 125 can be 25% or more of the total power used by power supply circuit 100. Further, this power loss generates undesirable heat dissipation.

Figure 2:
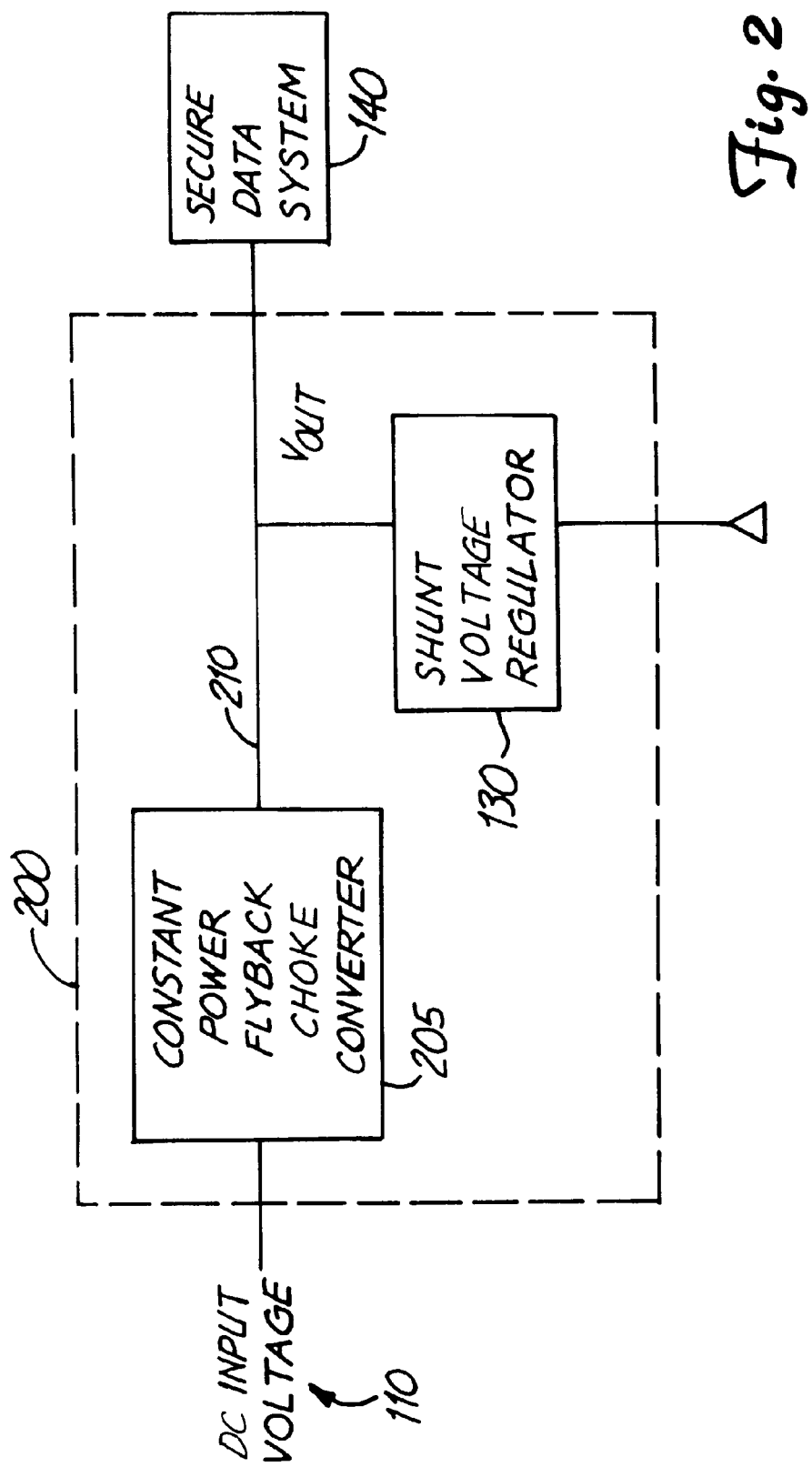
FIG. 2 is a block diagram illustrating the improved secure data system power supply of the present invention.

FIG. 2 is a block diagram illustrating secure data system power supply 200 in accordance with preferred embodiment of the present invention. Secure data system power supply 200 includes constant power flyback converter 205 and shunt voltage regulator 130. Similar to prior art power supply 100, secure data system power supply 200 receives a DC input voltage on input line 110, and provides on output line 210 a current for use in operating secure data system 140. In power supply 200, shunt voltage regulator 130 is connected directly to the output of constant power flyback converter 205 in order to provide substantially constant output voltage $V_{OUT}$ for use by secure data system 140.

A separate linear current source is not needed in power supply circuit 200. In the present invention, input voltage line 110 is isolated from secure data system 140 by converter 205. Converter 205, which feeds shunt voltage regulator 130, transfers constant power regardless of the data communicated within secure data system 140. Thus, data communicated within system 140 is undetectable on input line 110.

Figure 3A:
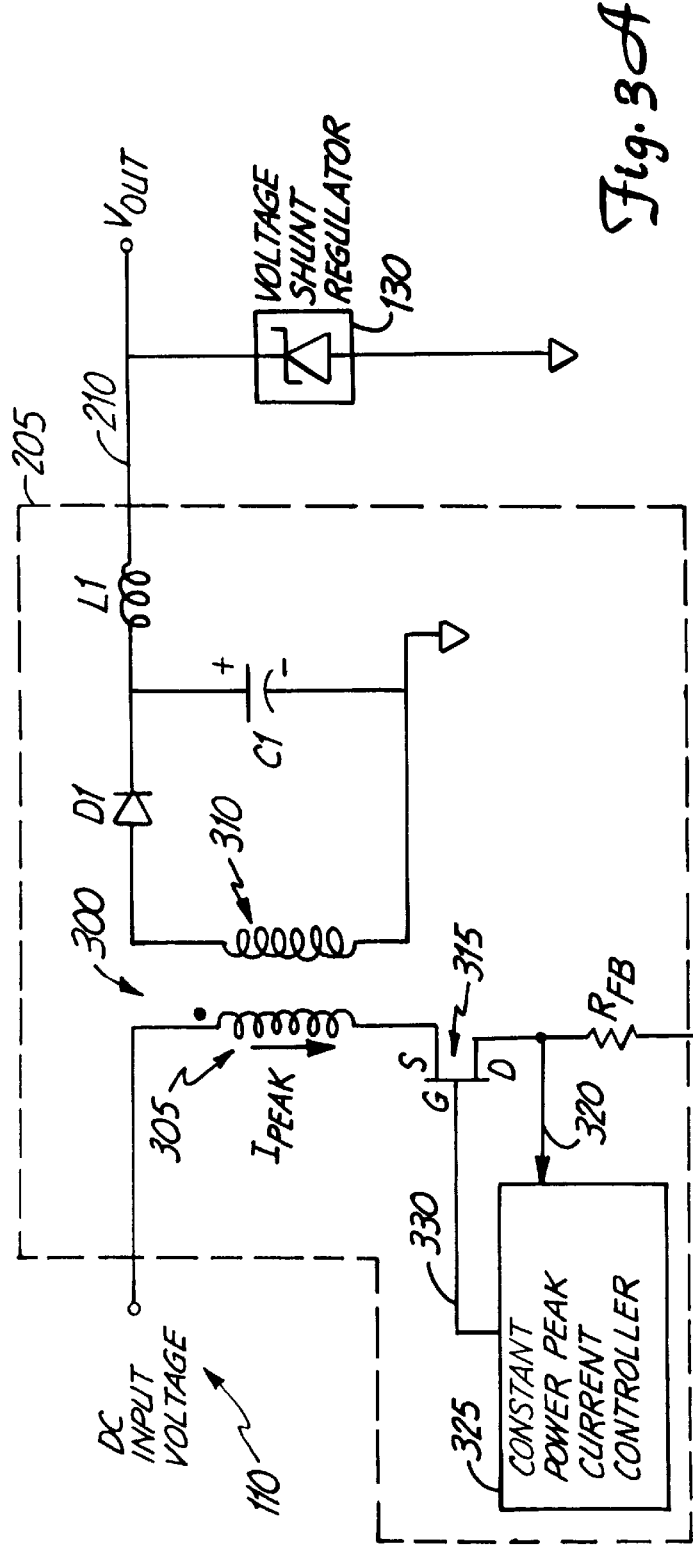
FIG. 3A is a schematic diagram illustrating in greater detail the secure data system power supply shown in FIG. 2.

FIG. 3A is a schematic diagram illustrating a preferred implementation of constant power flyback converter 205 in accordance with the present invention. As illustrated, converter 205 includes transformer 300 having primary windings 305 and secondary windings 310, power switching device 315, feedback resistor $R_{FB}$, constant power peak current controller 325, diode D1, capacitor C1, and inductor L1. Power switching device 315 is shown as being a field effect transistor (FET), but can be other types of power switching devices. Primary windings 305 of transformer 300 are connected to input voltage line 110 and to power FET 315 to form a flyback power converter. Transformer 300 acts as a coupled inductor for energy storage. Constant power peak current controller 325, operating at a constant frequency f, receives feedback input 320, from feedback resistor $R_{FB}$, which is directly indicative of the current through the primary winding of transformer 300. Using this information, constant power peak current controller 325 provides a control signal 330 to the gate of FET 315 to stop conduction at a fixed peak current. This maintains the power transferred into the primary windings of transformer 300 at a constant value.

A constant quantity of power is also transferred to secondary windings 310. Through diode D1, constant power is provided at output 210 of converter 205. Due to the flyback nature of converter 205, capacitor C1 and inductor L1 filter the output current pulses which results in a constant current to shunt voltage regulator 130. The constant output voltage $V_{OUT}$ is provided to secure data system 140 (shown in FIG. 2). Elimination of linear current source 125 required in prior art secure data system power supply 100 greatly reduces power consumption and associated heat dissipation of power supply 200.

Figure 3B:
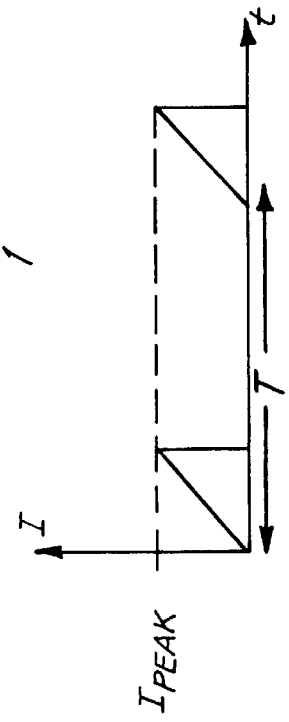
FIG. 3B is a plot of a waveform illustrating current in the primary windings of the transformer illustrated in FIG. 3A.

By applying a constant power to the primary windings of transformer 300, information communicated within secure data system 140 is highly isolated from input voltage line 110. In order to maintain a constant power input to the primary windings 305 of transformer 300, current controller 325 maintains the peak magnitude $I_{PEAK}$ of the current through primary windings 305 at a level which is as close to constant as possible. This is illustrated in the waveform shown in FIG. 3B. This in turn maintains the power transferred to primary windings 305 at a constant value. The power transferred to primary winding 305 is equal to one half of the inductance $L_P$ of primary windings 305 multiplied by the square of the peak current $I_{PEAK}$ and by the operating frequency f.

Also in order to maintain a constant power input to windings 305 to properly isolate input voltage line 110 from secure data system 140, the primary and secondary inductances are chosen to transfer the desired power while still operating in the discontinuous mode. The phrase discontinuous mode means that the current in the primary windings always returns to zero prior to the next cycle.

An important factor in maintaining constant power input to the primary of transformer 300 and in isolating input voltage line 110 from secure data system 140 is related to the feedback utilized by current controller 325. Typically, PWM chips control the duty cycle of the FET as a function of a voltage which is not directly related to the peak current value $I_{PEAK}$. For example, the pulse width is frequently controlled as a function of a voltage on capacitor C1. An important aspect of embodiments of the present invention is that FET 315 is preferably controlled solely as a function of the peak current through the primary windings. This results in the transfer of constant power to the voltage shunt regulator. The constant power flyback converter and shunt voltage regulator circuit of the present invention provides significant power savings over the prior art.

Figure 4:
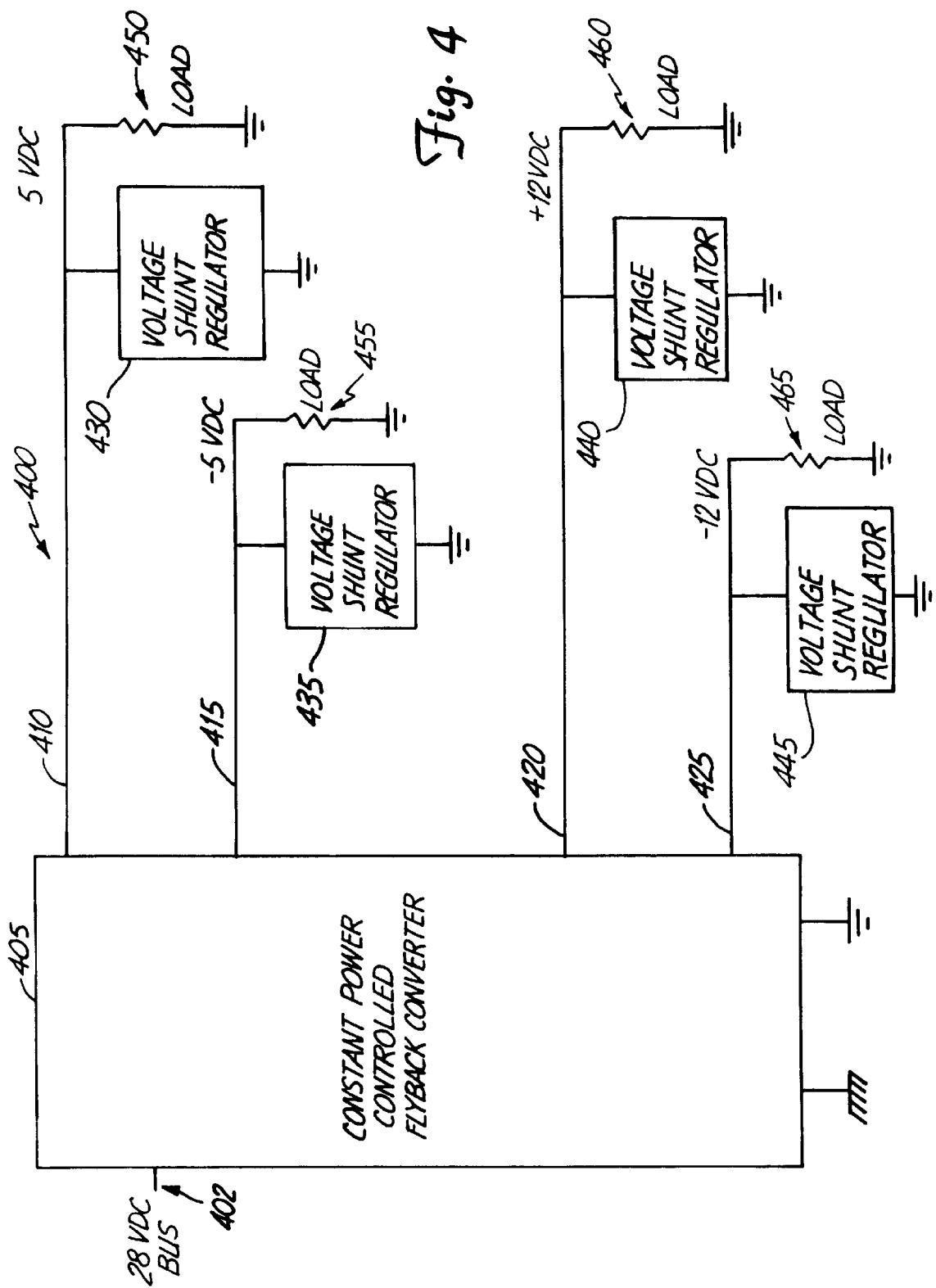
FIG. 4 is a block diagram illustrating a second embodiment of the secure data system power supply of the present invention, but with multiple output voltages provided for use by one or more secure data systems.
Figure 5:
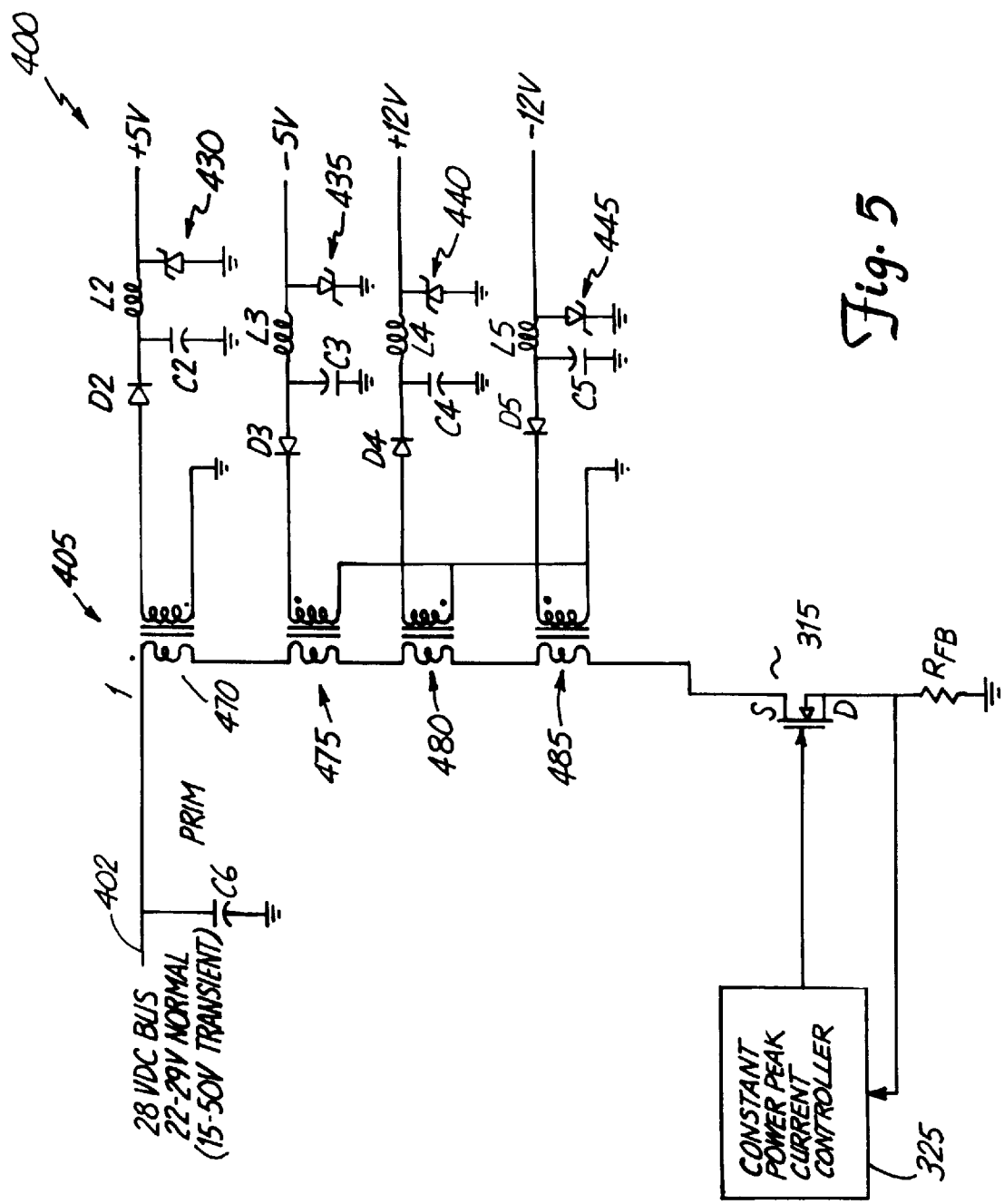
FIG. 5 is a schematic diagram illustrating in greater detail the secure data system power supply shown in FIG. 4.

FIG. 4 is a block diagram illustrating secure data system power supply 400 in accordance with alternate embodiments of the present invention to provide multiple outputs. Power supply 400 includes constant power flyback converter 405 and voltage shunt regulators 430, 435, 440 and 445. Loads 450, 455, 460 and 465 represent one or more secure data systems to which power supply 400 provides power. FIG. 5 is a schematic diagram illustrating one possible implementation of power supply 400 shown in FIG. 4. Like power supply 200 illustrated in FIGS. 2 and 3A, power supply 400 includes a constant power flyback converter. Converter 405 receives a DC input voltage at input line 402. By way of example, the input voltage at line 402 is shown to be 28 volts DC.

Unlike constant power flyback converter 205 of power supply 200, converter 405 of power supply 400 provides four separate outputs 410, 415, 420 and 425, each feeding a different one of voltage shunt regulators 430, 435, 440 and 445. However, only one controller 315 is needed for multiple outputs. The current and voltage outputs on each of output lines 410, 415, 420 and 425 are selected to achieve a different desired output voltage for use by one or more secure data systems. For example, as illustrated, power supply 400 is shown providing isolated +5 volt DC, -5 volt DC, +12 volt DC and -12 volt DC outputs for use by a secure data system.

FIG. 5 illustrates one possible implementation of power supply 400 in greater detail. As shown, flyback converter 405 is formed from four separate transformers 470, 475, 480 and 485. Each transformer primary is connected in series between the input voltage line 402 and power FET 315 so that constant power peak current controller 325 can maintain a constant peak current $I_{PEAK}$ through the primary windings of the transformers. As before, the transformers are designed so that a discontinuous flyback mode is maintained. Thus, the constant power input to the primary windings of transformers 470, 475, 480 and 485 isolates input voltage line 402 from any connected secure data system on the secondary side of the transformers. In the circuit shown in FIG. 5, the inductance value of each primary is in the same ratio as their respective power transfers. Also included in power supply 400 and associated with the respective transformers are diodes D2, D3, D4 and D5, as well as capacitors C2, C3, C4 and C5 and filter inductors L2, L3, L4 and L5.

Although the present invention has been described with reference to preferred embodiments, workers skilled in the art will recognize that changes may be made in form and detail without departing from the spirit and scope of the invention. In particular, for the embodiment shown in FIG. 5, the transformer primaries may be connected in series (as shown) or in parallel or series-parallel combination with each other. This allows options in the primary inductances values to simplify the transformer design.

What is claimed is:

1. A secure data system power supply having an input coupleable to an input voltage line and an output coupleable to a secure data system and providing isolation between the input voltage line and the secure data system, the secure data system power supply comprising:

a constant power flyback converter coupled between the input voltage line and the secure data system, the constant power flyback converter taking as an input from the input voltage line a constant power input and providing at a converter output an output signal for use in powering the secure data system, wherein the constant power flyback converter further comprises:

a transformer having a primary winding and a secondary winding, a first end of the primary winding being coupled to the input voltage line;

a power switching device coupled to a second end of the primary winding and providing a current path for current in the primary winding when the power switching device is conducting; and a constant power peak current controller providing a control signal to the power switching device to control conduction of the power switching device such that information communicated within the secure data system is undetectable from the input voltage line, wherein the constant power peak current controller controls the power switching device such that a constant quantity of power is applied to the primary winding of the transformer and such that a peak magnitude of the current in the primary winding of the transformer maintains a substantially constant value over a range of input voltages on the input voltage line; and a shunt voltage regulator coupled to the converter output and maintaining the output signal at a substantially constant voltage.

2. The secure data system power supply of claim 1, wherein the power switching device is a transistor.

3. The secure data system power supply of claim 2, wherein the constant power peak current controller is adapted to provide the control signal to the transistor solely as a function of a magnitude of the current in the primary winding of the transformer.

4. The secure data system power supply of claim 3, wherein the constant power peak current controller is adapted to provide the control signal to the transistor as a function of a comparison of the magnitude of the current in the primary winding of the transformer relative to a desired peak magnitude.

5. The secure data system power supply of claim 4, and further comprising a sense resistor in series with the transistor and the primary winding of the transformer, wherein the constant power peak current controller is adapted to provide the control signal to the transistor as a direct function of a magnitude of the current in the primary winding of the transformer by sensing a voltage drop across the sense resistor.

6. The secure data system power supply of claim 2, wherein the constant power peak current controller is adapted to provide the control signal to the transistor such that a duty cycle of the current in the primary winding of the transformer is maintained in a discontinuous mode.

7. A secure data system power supply having an input coupled to an input voltage line and an output coupled to a secure data system and providing isolation between the input voltage line and the secure data system, the secure data system power supply comprising:

shunt voltage regulating means coupled to the output of the power supply for maintaining an output voltage at a substantially constant value; and flyback transformer converter means coupled to the input voltage line and to the shunt voltage regulator for taking a constant quantity of power from the input voltage line and for providing a constant quantity of power for use by the secure data system while isolating the secure data system from the input voltage line such that information communicated within the secure data system is undetectable from the input voltage line.

8. The secure data system power supply of claim 7, wherein the flyback transformer converter further comprises:

a transformer having a primary winding and a secondary winding, a first end of the primary winding being coupled to the input voltage line;

a transistor coupled to a second end of the primary winding and providing a current path for current in the primary winding when the transistor is conducting; and a controller providing a control signal to the transistor to control conduction of the transistor, wherein the controller controls the transistor such that a constant quantity of power is applied to the primary winding of the transformer.

9. The secure data system power supply of claim 8, wherein the controller provides the control signal to the transistor such that a peak magnitude of the current in the primary winding of the transformer maintains a substantially constant value over time.

10. The secure data system power supply of claim 9, wherein the controller is adapted to provide the control signal to the transistor such that the peak magnitude of the current in the primary winding of the transformer maintains the substantially constant value over a range of input voltages on the input voltage line.

11. The secure data system power supply of claim 10, wherein the controller is adapted to provide the control signal to the transistor such that the current in the primary winding of the transformer is maintained in a discontinuous mode.

* * * * *

UNITED STATES PATENT AND TRADEMARK OFFICE
CERTIFICATE OF CORRECTION

PATENT NO.     : 6,023,155
DATED          : February 8, 2000
INVENTOR(S)    : Wayne A. Kalinsky et al.

It is certified that error appears in the above-identified patent and that said Letters Patent is hereby corrected as shown below:

<u>Column 1,</u>
Line 6, after "FIELD OF THE INVENTION" please insert the following new paragraph:
-- This invention was made with Government support under N00019-95-C-0004 awarded by the Department of the Navy. The Government has certain rights in this invention. --

Signed and Sealed this

Twenty-fifth Day of March, 2003

JAMES E. ROGAN
*Director of the United States Patent and Trademark Office*